(12) United States Patent
Garrett et al.

(10) Patent No.: US 6,397,337 B1
(45) Date of Patent: May 28, 2002

(54) UNIFIED PASSWORD PROMPT OF A COMPUTER SYSTEM

(75) Inventors: Michael R. Garrett; Randall L. Hess, both of Cypress; Chi W. So; Mohammed Anwar Ramiz, both of Houston, all of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/071,128

(22) Filed: Apr. 30, 1998

(51) Int. Cl.$^7$ .................................................. G06F 11/30
(52) U.S. Cl. ........................ 713/202; 713/200; 713/201; 711/116; 711/103; 709/225
(58) Field of Search ................................ 713/200, 202, 713/201, 310; 714/36, 6; 709/225, 229, 246, 311; 711/116, 103

(56) References Cited

U.S. PATENT DOCUMENTS

| | | | |
|---|---|---|---|
| 3,890,601 A | 6/1975 | Pietrolewicz | 340/172.5 |
| 4,959,860 A | 9/1990 | Watters et al. | 380/4 |
| 5,097,506 A | 3/1992 | Kaiser, Jr. et al. | 380/25 |
| 5,173,940 A | 12/1992 | Lantz et al. | 380/25 |
| 5,375,243 A | * 12/1994 | Parzych et al. | 395/725 |
| 5,377,343 A | 12/1994 | Yaezawa | 395/425 |
| 5,388,156 A | 2/1995 | Blackledge | 380/4 |
| 5,451,934 A | 9/1995 | Dawson | 340/825.31 |
| 5,533,125 A | 7/1996 | Bensimon | 380/4 |
| 5,574,786 A | * 11/1996 | Dayan et al. | 380/4 |

(List continued on next page.)

OTHER PUBLICATIONS

Compaq Computer Corporation, Compaq Deskpro/M, Family of Personal Computers, Reference Guide, pp.5–1 through 5–13.

*Primary Examiner*—David Wiley
*Assistant Examiner*—Firmin Backer
(74) *Attorney, Agent, or Firm*—Akin, Gump, Strauss, Hauer & Feld, LLP

(57) ABSTRACT

A computer system provides a unified password prompt for accepting a user power-on password or an administrator password. A password string entered by the system administrator at the unified password prompt is compared with a stored power-on password. If the user password string matches the stored power-on password, then access to system resources is granted. If the user password string does not match the stored power-on password, then the user password string is compared to a stored administrator password. If the user password string matches the stored administrative password, then access to system resources is granted. If the user password string does not match the stored administrative password, then the system administrator is given a predetermined number of times to enter a password string matching either the stored power-on password or the stored administrator password. If a password string matching either the stored power-on password or the stored administrator password is not provided in the predetermined number of times, access to system resources is denied. The unified password prompt does not require a system administrator to know a user's power-on password in order to access system resources. The unified password prompt also permits a system administrator to configure a plurality of computer systems by providing a single administrative password rather than a plurality of user power-on passwords.

39 Claims, 5 Drawing Sheets

U.S. PATENT DOCUMENTS

| | | | | |
|---|---|---|---|---|
| 5,708,777 A | * | 1/1998 | Sloan et al. | 395/188 |
| 5,781,793 A | * | 7/1998 | Lasvoire et al. | 395/800.37 |
| 5,892,906 A | * | 4/1999 | Chou et al. | 395/188.01 |
| 5,960,084 A | * | 9/1999 | Angelo | 380/25 |
| 5,963,142 A | * | 10/1999 | Zinsky et al. | 340/825.34 |
| 5,964,877 A | * | 10/1999 | Victor et al. | 713/202 |
| 5,978,920 A | * | 11/1999 | Lee | 713/202 |
| 5,983,349 A | * | 11/1999 | Kodama et al. | 713/200 |
| 6,000,033 A | * | 12/1999 | Kelley et al. | 713/201 |
| 6,012,145 A | * | 1/2000 | Mathers et al. | 713/202 |
| 6,012,146 A | * | 1/2000 | Liebenow | 713/202 |
| 6,032,257 A | * | 2/2000 | Olarig et al. | 713/200 |
| 6,125,457 A | * | 9/2000 | Crisan et al. | 714/36 |
| 6,145,085 A | * | 11/2000 | Tran et al. | 713/202 |

* cited by examiner

UNIFIED PASSWORD PROMPT OF A COMPUTER SYSTEM

BACKGROUND OF THE INVENTION

1. Field of the Invention

The present invention relates to personal computer systems having password protection, and more particularly to personal computer systems for use with an administrator password and a user power-on password.

2. Description of the Related Art

Security has become an important issue for computer systems. Password protection is now a common feature protecting computer systems from unauthorized users. With added levels of security comes the annoyance of memorizing and entering multiple passwords before a system can be booted or system resources can be modified. System administrators must be able to change a computer's resources at any time. System administrators thus are hindered by having to enter multiple passwords at boot-up to accomplish this task.

A conventional method for a system administrator to modify a system resource has required multiple password prompts. When a computer system is powered on, Basic Input Output System (BIOS) code is executed. The BIOS code goes through a power-on-self test (POST). At a certain point in POST, POST is paused and a power-on password prompt is provided. For POST to continue, a correct user power-on password must be provided at the power-on password prompt. If a system administrator desires to modify a system resource, then an administrator password prompt is provided at which the administrative password must be entered. A system administrator thus must enter two passwords before being able to modify system resources. If a system administrator does not know the user's power-on password, then the system administrator is unable to perform system resource modifications.

SUMMARY OF THE INVENTION

A computer system in accordance with the present invention provides a unified password prompt for accepting a user power-on password or an administrator password. A password string entered by the user at the unified password prompt is compared with a stored power-on password. If the user password string matches the stored power-on password, then access to system resources is granted. If the user password string does not match the stored power-on password, then the user password string is compared to a stored administrator password. If the user password string matches the stored administrative password, then access to system resources is granted. If the user password string does not match the stored administrative password, then the system administrator is given a predetermined number of times to enter a password string matching either the stored power-on password or the stored administrator password. If a password string matching either the stored power-on password or the stored administrator password is not provided in the predetermined number of times, access to system resources is denied. A unified password prompt in accordance with the present invention does not require a system administrator to know a user's power-on password in order to access system resources. A unified password prompt also permits a system administrator to configure a plurality of computer systems by providing a single administrative password rather than a plurality of user power-on passwords.

BRIEF DESCRIPTION OF THE DRAWINGS

A better understanding of the present invention can be obtained when the following detailed description of the disclosed embodiment is considered in conjunction with the following drawings, in which.

DETAILED DESCRIPTION OF THE DISCLOSED EMBODIMENT

The following patents are hereby incorporated by reference:

Commonly-assigned U.S. Pat. No. 4,959,860, entitled "USER POWER-ON PASSWORD FUNCTIONS FOR COMPUTER SYSTEM," granted Sep. 25, 1990;

Commonly-assigned U.S. Pat. No. 5,375,243, entitled "HARD DISK PASSWORD SECURITY SYSTEM," granted Dec. 20, 1994; and Commonly-assigned U.S. Pat. No. 5,097,506, entitled "KEYBOARD PASSWORD LOCK," granted Mar. 17, 1992.

The following patent applications are hereby incorporated by reference:

Commonly-assigned U.S. patent application Ser. No. 08/396,343, entitled "SECURITY CONTROL FOR PERSONAL COMPUTER," filed on Mar. 3, 1995; and Commonly-assigned U.S. patent application Ser. No. 09/070,458, entitled "METHOD AND APPARATUS FOR PROVIDING REMOTE ACCESS TO SECURITY FEATURES ON A COMPUTER NETWORK," filed Apr. 30, 1998.

Figure 1:
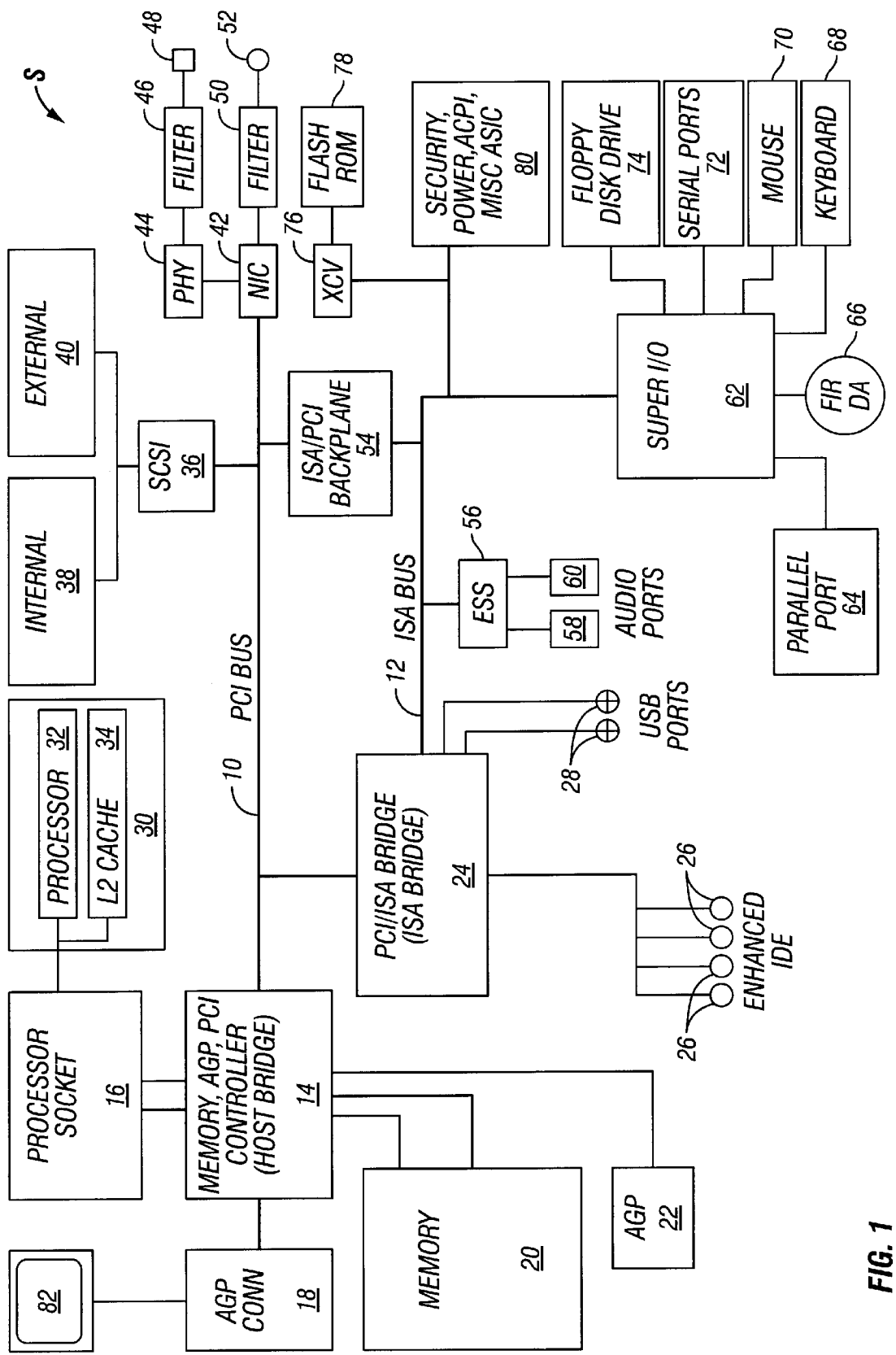
FIG. 1 is a schematic diagram of a computer system in accordance with the present invention.

Turning to FIG. 1, illustrated is a typical computer system S implemented according to the invention. While this system is illustrative of one embodiment, the techniques according to the invention can be implemented in a wide variety of systems. The computer system S in the illustrated embodiment is a PCI bus/ISA bus based machine, having a peripheral component interconnect (PCI) bus 10 and an industry standard architecture (ISA) bus 12. The PCI bus 10 is controlled by PCI controller circuitry located within a memory/accelerated graphics port (AGP)/PCI controller 14. This controller 14 (the "host bridge") couples the PCI bus 10 to a processor socket 16 via a host bus, an AGP connector 18, a memory subsystem 20, and an AGP 22. A second bridge circuit, a PCI/ISA bridge 24 (the "ISA bridges") bridges between the PCI bus 10 and the ISA bus 12.

The host bridge 14 in the disclosed embodiment is a 440LX Integrated Circuit by Intel Corporation, also known as the PCI AGP Controller (PAC). The ISA bridge 24 is a PIIX4, also by Intel Corporation. The host bridge 14 and ISA bridge 24 provide capabilities other than bridging between the processor socket 16 and the PCI bus 10, and the PCI bus 10 and the ISA bus 12. Specifically, the disclosed host bridge 14 includes interface circuitry for the AGP connector 18, the memory subsystem 20, and the AGP 22. The ISA bridge 24 further includes an internal enhanced IDE controller for controlling up to four enhanced IDE drives 26, and a universal serial bus (USB) controller for controlling USB ports 28.

The host bridge 14 is preferably coupled to the processor socket 16, which is preferably designed to receive a Pentium II processor module 30, which in turn includes a microprocessor core 32 and a level two (L2) cache 34. The processor socket 16 could be replaced with different processors other than the Pentium II without detracting from the spirit of the invention.

The host bridge 14, when the Intel 440LX North Bridge is employed, supports extended data out (EDO) dynamic random access memory (DRAM) and synchronous DRAM (SDRAM), a 64/72-bit data path memory, a maximum memory capacity of one gigabyte, dual inline memory module (DIMM) presence detect, eight row address strobe (RAS) lines, error correcting code (ECC) with single and multiple bit error detection, read-around-write with host for PCI reads, and 3.3 volt DRAMs. The host bridge 14 support up to 66 megahertz DRAMs, whereas the processor socket 16 can support various integral and non-integral multiples of that speed.

The ISA bridge 24 also includes enhanced power management. It supports a PCI bus at 30 or 33 megahertz and an ISA bus 12 at ¼ of the PCI bus frequency. PCI revision 2.1 is supported with both positive and subtractive decode. The standard personal computer input/output (I/O) functions are supported, including a dynamic memory access (DMA) controller, two 82C59 interrupt controllers, an 8254 timer, a real time clock (RTC) with a 256 byte couple metal oxide semiconductor (CMOS) static RAM (SRAM), and chip selects for system read only memory (ROM), RTC, keyboard controller, an external microcontroller, and two general purpose devices. The enhanced power management within the ISA bridge 24 includes full clock control, device management, suspend and resume logic, advanced configuration and power interface (ACPI), and system management bus (SMBus) control, which implement the inter-integrated circuit ($I^2C$) protocol.

The PCI bus 10 couples a variety of devices that generally take advantage of a high speed data path. This includes a small computer system interface (SCSI) controller 36, with both an internal port 38 and an external port 40. In the disclosed embodiment, the SCSI controller 36 is a AIC-7860 SCSI controller. Also coupled to the PCI bus 10 is a network interface controller (NIC) 42, which preferably supports the ThunderLan$^{TN}$ power management specification by Texas Instruments. The NIC 42 is coupled through a physical layer 44 and a filter 46 to an RJ45 jack 48, and through a filter 50 to a AUI jack 52.

Between the PCI Bus 10 and the ISA Bus 12, an ISA/PCI backplane 54 is provided which include a number of PCI and ISA slots. This allows ISA cards or PCI cards to be installed into the system for added functionality.

Further coupled to the ISA Bus 12 is an enhanced sound system chip (ESS) 56, which provides sound management through an audio in port 58 and an audio out port 60. The ISA bus 12 also couples the ISA bridge 24 to a Super I/O chip 62, which in the disclosed embodiment is a National Semiconductor Corporation PC87307VUL device. This Super I/O chip 62 provides a variety of input/output functionality, including a parallel port 64, an infrared port 66, a keyboard controller for a keyboard 68, a mouse port for a mouse port 70, additional series ports 72, and a floppy disk drive controller for a floppy disk drive 74. These devices are coupled through connectors to the Super I/O 62.

The ISA bus 12 is also coupled through bus transceivers 76 to a flash ROM 78, which can include both basic input/output system (BIOS) code for execution by the processor 32, as well as an additional code for execution by microcontrollers in a ROM-sharing arrangement.

The ISA bus 12 further couples the ISA bridge 24 to a security, power, ACPI, and miscellaneous application specific integrated circuit (ASIC) 80, which provides a variety of miscellaneous functions for the system. The ASIC 80 includes security features, system power control, light emitting diode (LED) control, a PCI arbiter, remote wake up logic, system fan control, hood lock control, ACPI registers and support, system temperature control, and various glue logic. Finally, a video display 82 can be coupled to the AGP connector 18 for display of data by the computer system S. Again, a wide variety of systems could be used instead of the disclosed system S without detracting from the spirit of the invention.

Figure 2:
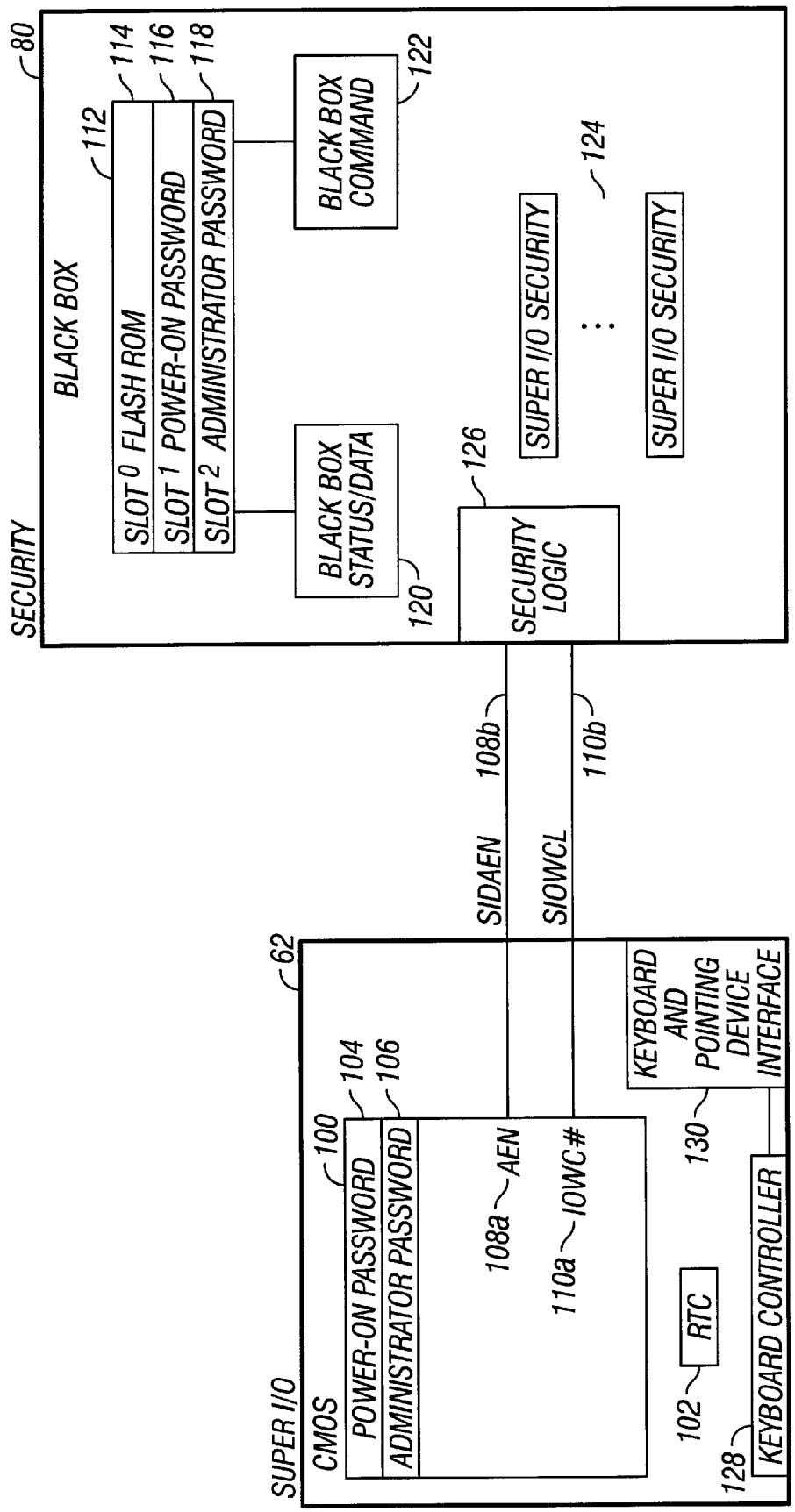
FIG. 2 is a schematic diagram of a super I/O chip and a security ASIC of the computer system of FIG. 1.

Referring to FIG. 2, the contents of the super I/O chip 62 and security ASIC 80 used for a unified password prompt process in accordance with the present invention are shown. The super I/O chip 62 includes a CMOS memory 100 having a CMOS location 104 for storing a user power-on password and a CMOS location 106 for storing an administrator password. Access to these CMOS locations is controlled by an AEN signal 108a externally designated as SIOAEN 108b and the IOWC# signal 110a externally designated as SIO-WCL 110b. The super I/O chip 62 also includes a real time clock (RTC) 102. It should be understood that other components within the super I/O chip 62 which are not related to the present invention have been omitted.

The security ASIC 80 includes a "black box" 112. The black box, which is a secure memory device used for locking and unlocking resources within the computer system S, is coupled to a black box status/data register 120 and a black box command register 122. In the disclosed embodiment, the black box 112 provides three slots: Slot 0, Slot 1 and Slot 2, respectively. Slot 0 indicated at 114 is used to store a password for locking and unlocking the flash ROM 78. When the flash ROM 78 is in a locked state, programming of the flash ROM 78 is disabled. When the flash ROM 78 is in an unlocked state, programming of the flash ROM 78 is enabled. Slot 1 indicated at 116 is used for storing a user power-on password. The user power-on password controls entry into and/or exit from a user password protected mode. For example, the user power-on password may be used to control locking and unlocking of the keyboard 68. Slot 2 indicated at 118 is used for storing the administrator password. An administrator password places the computer system S into an administrator mode. Certain features of the computer system S are exclusively controllable within the administrator mode. In the disclosed embodiment, these features include setup of the computer system S from a floppy drive 74 or a system partition, flashing the system ROM 78, and controlling an electronic hood lock. The electronic hood lock controls access to the interior of the computer system S. If the electronic hood lock is enabled, access to the interior to the computer system S is inhibited to prevent unwanted configuration changes or component removal. The administrator password of slot 2 118 is preferably the password in slot 0 114 for protecting the system ROM 78.

In the disclosed embodiment, the blackbox command register 122 is a seven bit read/write register. Bits 7–5 are index bits allowing for selection of a particular slot of the black box 112. A command provided to the blackbox command register 122 is directed to the particular slot selected. Bit 4 is preferably reserved and therefore should return a '0' when read. Bits 3–0 are used for storing a blackbox command provided to the blackbox command register 122. The command sequence "0000" represents a Read Status blackbox command. The Read Status blackbox command causes the next byte read from the blackbox status/data register 120 to be the status of the black box 112. The command sequence "0001" represents the Store Password blackbox command. Following the Store Password blackbox command, the next eight bytes written to the blackbox status/data register 120 are stored as the password. The command sequence "0010" represents the Protect Resources blackbox command. The Protect Resources blackbox command locks a selected blackbox slot. The command sequence "0100" represents the Store Password blackbox command. The Store Password blackbox command serves two functions. If each byte of the next eight bytes written to the status/data blackbox register 120 are the same, then the Store Password blackbox command unlocks the selected blackbox slot. If the bytes of the next eight bytes written to the status/data blackbox register 120 are not the same, then the Store Password command causes the bytes to be compared with the stored password. The command sequence "1000" represents the Permanently Locked Resources blackbox command. The Permanently Locked Resources blackbox command prohibits access to the selected blackbox slot until the security ASIC 80 is reset.

Further, in the disclosed embodiment, the blackbox status/data register 120 is a seven bit read/write register. For a write operation, bits 7–0 represent the password byte. While the blackbox status/data register 120 serves as a data register for a write operation, the blackbox status/data register 120 serves as a status register for a read operation. Referring to a read operation, bits 7–5 represent index bits for selection of a particular slot of the black box 112. Bits 4–3 are reserved and therefore should return a "0" if read. Bit 2 indicates whether a selected slot is permanently locked. If a "1" is stored in bit 2, the selected slot is permanently locked, and if a "0" is stored in bit 2, the selected slot is not permanently locked. Bit 1 indicates whether a delay is in progress. A delay in progress occurs when there is a password mismatch. If there is a password match, there is no delay in progress. In the disclosed embodiment, a "1" refers to a delay in progress, and a "0" refers to the absence of a delay in progress. The 0 bit indicates whether the selected slot is protected or unprotected. If a "1" is stored in the 0 bit, the selected slot is protected, and if a "0" is stored in bit 0, the selected slot is unprotected. Further details concerning the operation of the black box 112, the blackbox command register 122 and the blackbox status/data register 120 are provided in commonly-assigned U.S. patent application Ser. No. 08/396,343, entitled "SECURITY CONTROL FOR PERSONAL COMPUTER," and commonly-owned U.S. patent application Ser. No. 09/070,458, entitled "METHOD AND APPARATUS FOR PROVIDING REMOTE ACCESS TO SECURITY FEATURES ON A COMPUTER NETWORK," previously incorporated by reference. It should be understood that the number of bits and bytes and the particular bit sequences described may be varied to achieve other embodiments of the black box 112.

The security ASIC 80 also includes security logic 126 for controlling the SIOAEN signal 108*b* and the SIOWCL signal 110*b*. If the security logic 126 asserts the SIOAEN signal 108*b*, blockage of write operations to the user power-on password CMOS location 104 and the administrator password CMOS location 106 occurs. If the security logic 126 asserts the SIOWCL signal 110*b*, both writes and reads are blocked to the user power-on password CMOS location 104 and the administrator password CMOS location 106. If both the SIOAEN signal 108*b* and SIOWCL signal 110*b* are deasserted, read and write cycles to the user power-on password CMOS location 104 and the administrator password location CMOS 106 may be decoded. The SIOAEN signal 108*b* and the SIOWCL signal 110*b* may also be used to prevent read and/or write access to super I/O security registers 124 within the security ASIC 80.

Figure 3A:
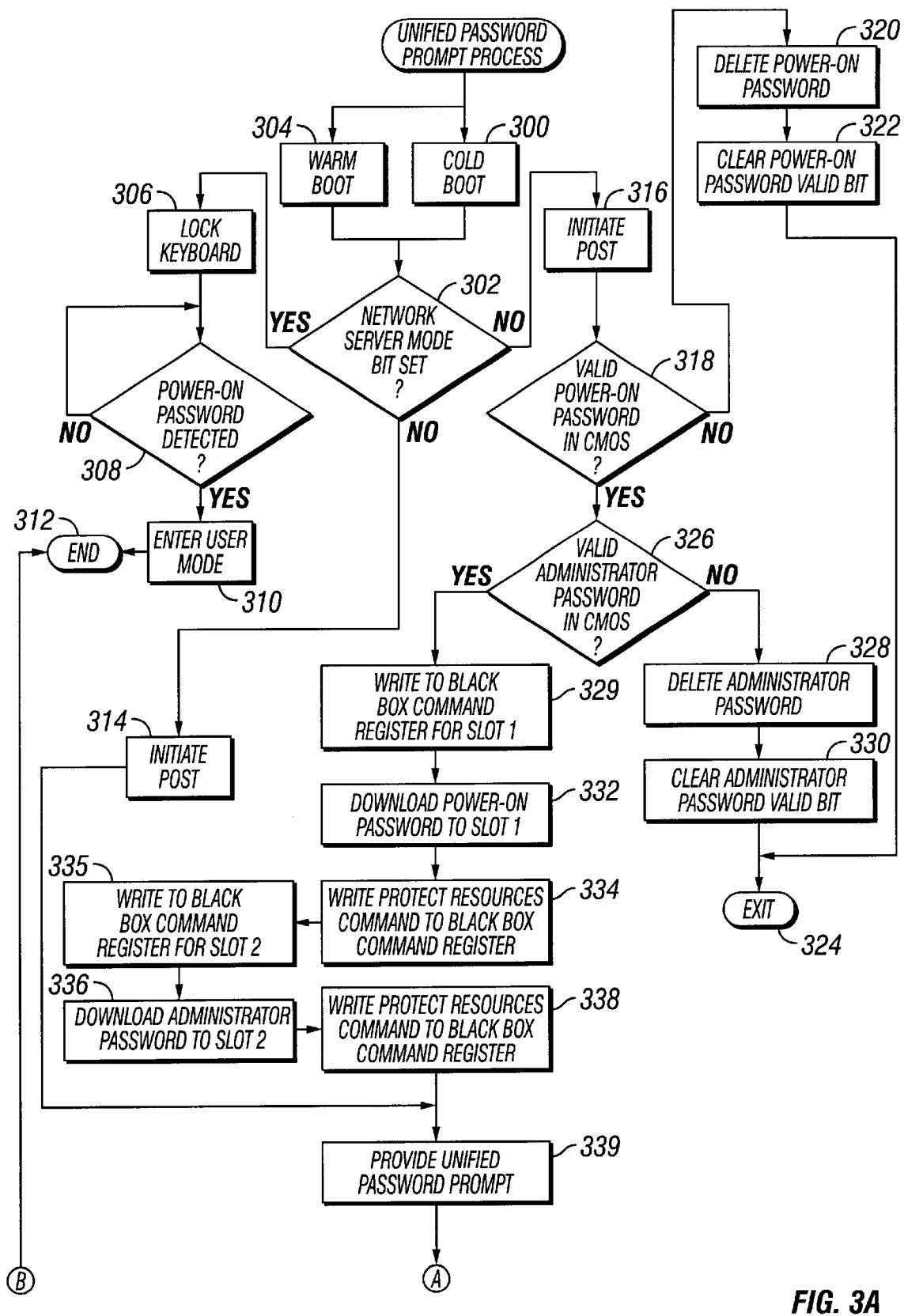
FIGS. 3A–3B are flowcharts of a unified password prompt process in accordance with the present invention.
Figure 3B:
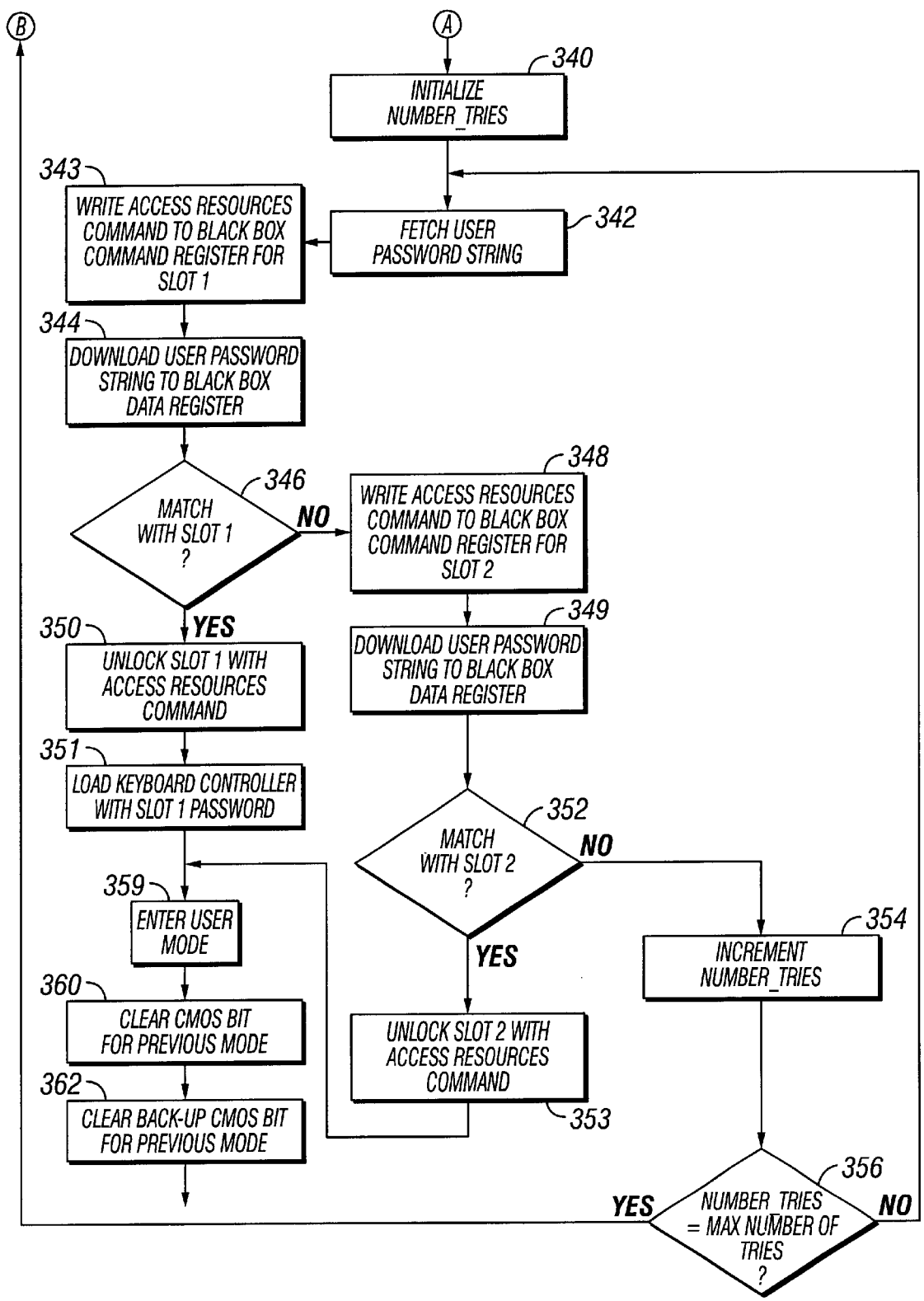

Referring to FIGS. 3A–3B, a unified password prompt process in accordance with the present invention is shown. In the disclosed embodiment, the unified password prompt process is performed by the processor 32 executing password verification code within BIOS. The process begins with either a cold boot in step 300 or a warm boot in step 304. From both step 304 and step 300, control proceeds to step 302 wherein it is determined if a network server mode bit is set. When the network serve mode bit is set, the computer system S is in a network server mode. During the network server mode, the keyboard 68 of the computer system S is disabled. If the network server mode bit is set, control proceeds to step 306 wherein the keyboard 68 is locked. Control then proceeds to step 308 wherein it is determined if the user power-on password is detected. If a user power-on password is not detected, control returns to step 308. The computer system S thus remains in a network server mode until a user power-on password is detected. If a user power-on password is detected in step 308, control proceeds to step 310 wherein the computer system S enters a user mode. From step 310, control terminates through step 312.

If the network server mode bit is not set and a cold boot was initiated, control proceeds from step 302 to step 316. In step 316 a user power-on-self-test (POST) is initiated. Control then proceeds to step 318 wherein it is determined if a valid user power-on password is present at the user power-on password CMOS location 104. If the user power-on password is invalid, control proceeds to step 320 wherein the user power-on password is deleted at the user power-on password CMOS location 104. Control then proceeds to step 322 wherein a user power-on password valid bit is cleared. From step 322, control exits through step 324.

If the user power-on password is valid, control proceeds from step 318 to step 326. In step 326, it is determined whether the administrator password stored at the administrator password CMOS location 106 is valid. If the administrator password is invalid, control proceeds to step 328 wherein the administrative password is deleted. From step 328, control proceeds to step 330 wherein an administrator password valid bit is cleared. Control then exits through step 324.

If the administrative password is valid, control proceeds from step 326 to step 329 wherein the Store Password blackbox command is written to the blackbox command register 122 for slot 1 116. Control then proceeds to step 332 wherein the user power-on password is downloaded to slot 1 116. This download is achieved by writing the user power-on password to the blackbox status/data register 120. Writing the user power-on password to the blackbox status/data register 120 with slot 1 selected following a Store Password blackbox command causes the user power-on password to be stored in slot 1 116. From step 332, control proceeds to step 334 wherein the Protect Resources blackbox command is written to the blackbox command register 122. This command places slot 1 is a locked state. Control next proceeds to step 335 wherein the Store Password blackbox command is written to the blackbox command register 122 for slot 2 118. From step 335, control proceeds to step 336 wherein the administrator password is downloaded to slot 2. This download is achieved by writing the administrator password to the blackbox status/data register 120 following a Store Password blackbox command written to the blackbox status/data register 120. Control next proceeds to step 338 wherein the Protect Resources blackbox command is written to the blackbox command register 122 for slot 2. This command places slot 2 in a locked state.

If the network server mode bit is not set and a warm boot was initiated, control proceeds from step 302 to step 314. In step 314, POST is initiated. From step 314 and step 338, control proceeds to step 339 wherein a unified password prompt in accordance with the present invention is provided. Unlike a conventional password prompt, the unified password prompt may accept a user power-on password or an administrator password. One advantage of a unified password prompt is that an administrator does not need to know the user power-on password for a computer system. Control next proceeds to step 340 (FIG. 3B). In step 340, the NUMBER_TRIES variable is initialized. This variable, which is preferably initialized by setting it to '0,' tracks the number of times the user has entered a string at the unified password prompt. From step 340, control proceeds to step 342 wherein a user password string is fetched. A user password string refers to a string entered by the user at the unified password prompt. From step 342, control proceeds to step 343 wherein the Access Resources blackbox command is written to the blackbox command register 122 for slot 1. This command causes the next eight bytes written to the blackbox status/data register 120 to be stored in slot 1.

Control then proceeds to step 344 wherein the user password string is downloaded to the blackbox status/data register 120. From step 344, control proceeds to step 346 wherein it is determined if the user password string matches the user power-on password stored in slot 1 116. If there is a match, control proceeds to step 350 wherein slot 1 is unlocked with the Access Resources blackbox command. The Access Resources blackbox command unlocks a slot if each byte of the command is the same. Control then proceeds to step 351 wherein a keyboard controller 128 (FIG. 2) is loaded with a slot 1 password. The keyboard controller 128 is a controller within the super I/O chip 62 for connecting to the keyboard 68. Loading the user power-on password of slot 1 116 to the keyboard controller 128 allows for a quicklock mode option for the computer system S. When a quicklock mode is enabled, a keyboard and pointing device interface 130 (FIG. 2) is disabled. A user power-on password may be used to disable the quicklock mode. By loading the keyboard controller 128 with the user power-on password, the keyboard controller 128 is able to detect when a user power-on password has been entered during a quicklock mode.

If the user password string does not match the slot 1 password in step 346, control proceeds to step 348 wherein the Access Resources blackbox command is written to the blackbox command register 122 for slot 2 118. Control then proceeds to step 349 wherein the user password string is downloaded to the blackbox data register 120. Providing the user password string to the blackbox data register following an Access Resource blackbox command causes a user password string to be stored in slot 2. From step 349, control proceeds to step 352 wherein it is determined if the user password string matches the password stored in slot 2 118. If there is not a match, control proceeds to step 354 wherein the NUMBER_TRIES variable is incremented. Control then proceeds to step 356 wherein it is determined if the NUMBER_TRIES variable is equal to the maximum number of tries allowed by the unified password prompt process. In the disclosed embodiment, the maximum number of tries for a user to attempt to enter the correct password is three. If NUMBER_TRIES is equal to the maximum number of tries, control terminates through step 312. If NUMBER_TRIES is not equal to the maximum number of tries, control returns to step 342 wherein the user may enter another password string.

If there is a match in step 352, control proceeds to step 353 wherein slot 2 is unlocked by an Access Resources blackbox command. From step 353, control proceeds to step 359 wherein the computer system S enters a user mode. By providing a unified password prompt in accordance with the present invention, entry into a user mode may be obtained using an administrator password or a user power-on password. From step 359, control proceeds to step 360 wherein the CMOS bit for the previous mode is cleared. Control then proceeds to step 362 wherein the backup CMOS bit for the previous mode is cleared. From step 362, control terminates through step 312.

Figure 4:
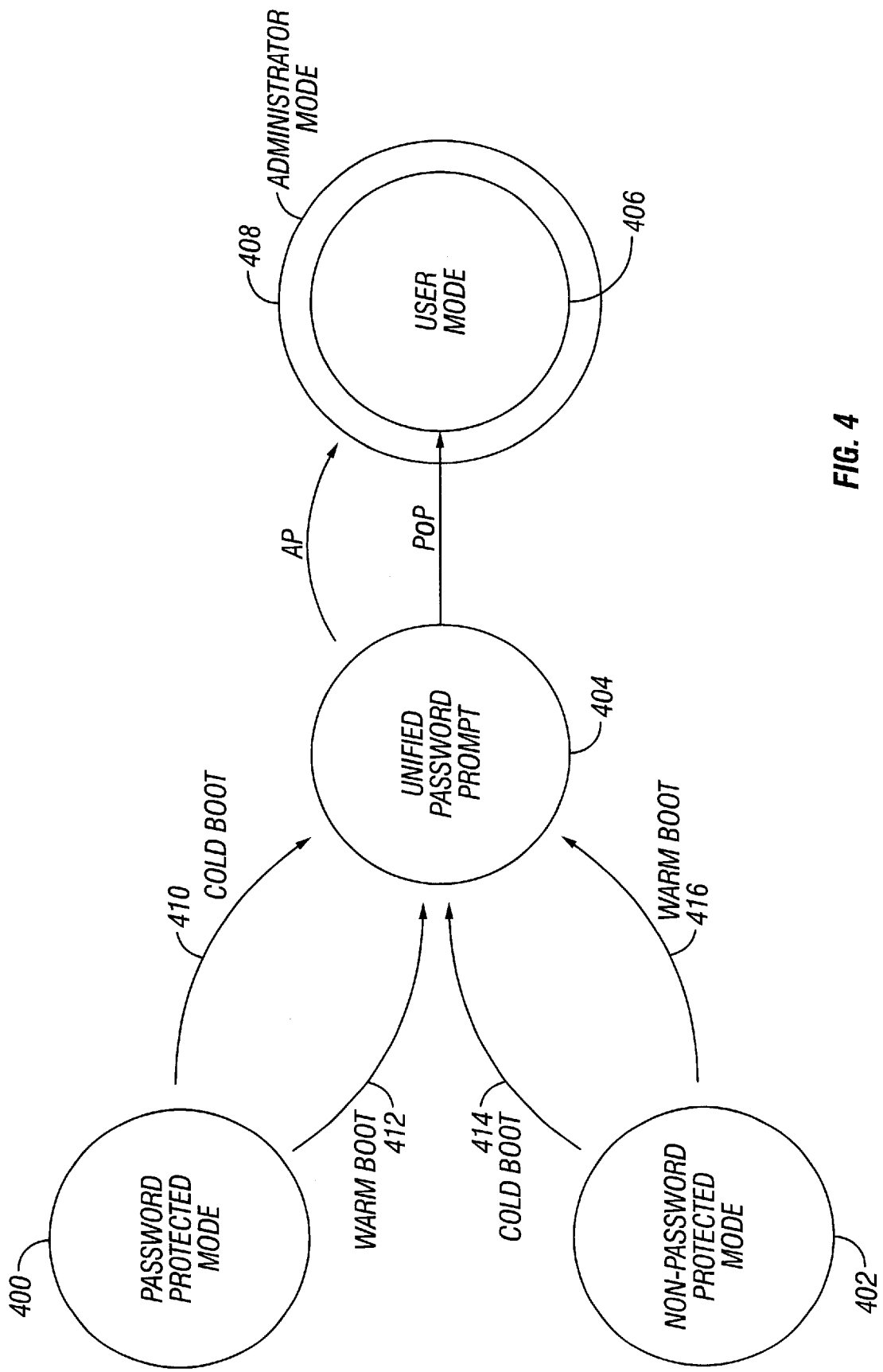
FIG. 4 is a state diagram further illustrating a unified password prompt process in accordance with the present invention.

Referring to FIG. 4, a form of state diagram showing the various mode transitions supported by a unified password prompt process in accordance with the present invention is shown. The unified password prompt 404 may be obtained from a password protected mode 400 or a non-password protected mode 402. A cold boot 410 or a warm boot 412 transitions the computer system S from a password protected mode 400 to provide the unified password prompt 404. A cold boot 414 or a warm boot 416 may also transition the computer system S from a non-password protected mode 402 to provide the unified password prompt 404. An administrator may therefore obtain the unified password prompt 404 from a password protected mode 400 or a non-password protected mode 402 following a cold boot or a warm boot. An example of a password protected mode 400 is a quicklock mode.

The unified password prompt 404 may accept a user power-on password PoP or an administrator password AP. The user power-on password PoP provided at the unified password prompt 404 places the computer system S in a user mode 406. An administrator password AP provided at unified password prompt 404 places the computer system S in an administrator mode 408. In accordance with the present invention, the user mode 406 is defined as a complete subset of the administrator mode 408. In a conventional computer system, a user mode has not been a complete subset of an administrator mode. As such, certain functions were only supported by a user mode. These functions which were exclusively supported by a user mode have been unavailable to a system administrator unless the system administrator knew a user's power-on password. In accordance with the present invention, all functions supported by a user mode are now available to a system administrator who is unaware of a user's power-on password. The unified password prompt 404 is particularly useful to an administrator desiring to configure a plurality of computer systems since the unified password prompt permits a system administrator to enter a single administrator password rather than a plurality of user power-on passwords.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A method of controlling administrator and user entry into a user password protected mode of a computer system, comprising the steps of:

generating a unified password prompt for accepting a user input string matching a user power-on password or an administrator password;

detecting a user input string entered at said unified password prompt;

entering a user password protected mode if said user input string entered at said unified password prompt matches said user power-on password; and entering said user password protected mode if said user input string entered at said unified password prompt matches said administrator password.

2. The method of claim 1, further comprising the step of:
comparing said user input string entered at said unified password prompt to said administrator password.

3. The method of claim 1, further comprising the step of:
comparing said user input string entered at said unified password prompt to said user power-on password.

4. The method of claim 1, wherein said user password protected mode allows for accessing and changing said user power-on password.

5. The method of claim 1, further comprising the step of:
initiating a cold boot resulting in said step of generating a unified password prompt.

6. The method of claim 5, the computer system including a non-volatile memory storing said user power-on password and said administrator password, further comprising the steps of:

downloading said user power-on password from the non-volatile memory to a first security memory slot;

downloading said administrator password from the non-volatile memory to a second security memory slot;

locking the non-volatile memory and the security memory slots after said steps of downloading said user power-on password and said administrator password;

unlocking the first security memory slot if the user input string entered at said unified password prompt matches said user power-on password; and unlocking the first security memory slot and the second memory slot if the user input string entered at said unified password prompt matches said administrator password.

7. The method of claim 1, further comprising the step of:
initiating a warm boot resulting in said step of generating a unified password prompt.

8. The method of claim 7, the computer system including a non-volatile memory storing said user power-on password and said administrator password and further including a first security memory slot storing the user power-on password and a second security memory slot storing the administrator password, further comprising the steps of:

unlocking the first security memory slot if the user input string entered at said unified password prompt matches said user power-up password; and unlocking the first security memory slot and the second security memory slot if the user input string entered at said unified password prompt matches said administrator password.

9. A method of controlling administrator and user exit from a user password protected mode of a computer system, comprising the steps of:

generating a unified password prompt for accepting a user input string matching a user power-on password or an administrator password;

detecting a user input string entered at said unified password prompt;

exiting a user password protected mode if said user input string entered at said unified password prompt matches said user power-on password; and exiting said user password protected mode if said user input string entered at said unified password prompt matches said administrator password.

10. The method of claim 9, further comprising the step of:
comparing said user input string entered at said unified password prompt to said user power-on password.

11. The method of claim 9, further comprising the step of:
comparing said user input string entered at said unified password prompt to said administrator password.

12. The method of claim 10, wherein said step of generating a unified password prompt is responsive to a cold boot of the computer system.

13. The method of claim 10, wherein said step of generating a unified password prompt is responsive to a warm boot of the computer system.

14. A method for administrator access to a user power-on password for a computer system using a single password, comprising the steps of:

generating a password prompt for a user input string;

detecting a user input string entered at the password prompt;

comparing said user input string to an administrator password; and allowing access to a user power-on-password if said user input string matches said administrator password.

15. The method of claim 14, wherein said allowing access step comprises the step of allowing said user power-on password to be changed.

16. The method of claim 14, further comprising the steps of:

comparing said user input string to said user power-on password; and allowing access to said user power-on if said user input string matches said user power-on password.

17. The method of claim 16, wherein said step of allowing access to said user power-on password if said user input string matches said user power-on password comprises the step of allowing said user power-on password to be changed.

18. A computer system for controlling administrator and user entry into a password protected mode of the computer system, further comprising:

a processor for executing code; and a non-volatile memory storing a user power-on password, an administrator password, and password verification code, the password verification code executable by the processor and when executed, performing the steps of:

generating a unified password prompt for accepting a user input string matching a user power-on password or an administrator password;

detecting a user input string entered at said unified password prompt;

entering a user password protected mode of said user input string entered at said unified password prompt matching said user power-on password; and entering said user password protected mode if said user input string entered at said unified password prompt matches said administrator password.

19. The computer system of claim 18, the processor further performing the step of:

comparing said user input string entered at said unified password prompt to said administrator password.

20. The computer system of claim 18, the processor further performing the step of:

comparing said user input string entered at said unified password prompt to said user power-on password.

21. The computer system of claim 18, wherein said user password protected mode allows for accessing and changing said user power-on password.

22. The computer system of claim 18, the processor further performing the step of:
  initiating a cold boot of the computer system resulting in said step of generating a unified password prompt.

23. The computer system of claim 18, the processor further performing the steps of:
  downloading said user power-on password from the non-volatile memory to a first security memory slot;
  downloading said administrator password from the non-volatile memory to a second security memory slot;
  locking the non-volatile memory and the security memory slots after said step of downloading said user power-on password and said administrator password;
  unlocking the first security memory slot if the user input string entered at said unified password prompt matches said user power-on password; and
  unlocking the first security memory slot and the second security memory slot if the user input string entered at said unified password prompt matches said administrator password.

24. The computer system of claim 18, the processor further performing the step of:
  initiating a warm boot resulting in said step of generating a unified password prompt.

25. The computer system of claim 24, the processor further performing the steps of:
  unlocking the first security memory slot if the user input string entered at said unified password prompt matches said user power-on password; and
  unlocking the first security memory slot and the second security memory slot if the user input string entered at said unified password prompt matches said administrator password.

26. The computer system of claim 18, the non-volatile memory comprising:
  a first non-volatile memory storing the administrator password and the user power-on password; and
  a second non-volatile memory storing the password verification code.

27. The computer system of claim 26, wherein the first non-volatile memory is a CMOS memory and the second non-volatile memory is a read-only memory.

28. The computer system of claim 18, further comprising:
  a security device coupled to the memory, comprising:
    a first security memory slot for storing the user power-on password; and
    a second security memory slot for storing the administrator password.

29. A computer system for controlling administrator and user exit from a user password protected mode, comprising:
  a processor for executing code; and
  memory storing a user power-on password, an adminsitrator password, and password verification code, the password verification code executable by the processor and when executed, performing the steps of:
    generating a unified password prompt for accepting a user input string matching a user power-on password or an administrator password;
    detecting a user input string entered at said unified password prompt;
    exiting a user password protected mode if said user input string entered at said unified password prompt matches said user power-on password; and
    exiting said user password protected mode if said user input string entered at said unified password prompt matches said administrator password.

30. The computer system of claim 29, the processor further performing the step of:
  comparing said user input string entered at said unified password prompt to said user power-on password.

31. The computer system of claim 29, the processor further performing the step of:
  comparing said user input string entered at said unified password prompt to said administrator password.

32. The computer system of claim 29, wherein said step of generating a unified password prompt is responsive to a cold boot of the computer system.

33. The computer system of claim 29, wherein said step of generating a unified password prompt is responsive to a warm boot of the computer system.

34. The computer system of claim 29, comprising:
  a first non-volatile memory storing the administrator password and the user power-on password; and
  a second non-volatile memory storing the password verification code.

35. The computer system of claim 34, wherein the first non-volatile memory is a CMOS memory and the second non-volatile memory is a read-only memory.

36. The computer system of claim 29, further comprising:
  a security device coupled to the memory, comprising:
    a first security memory slot for storing the user power-on password; and
    a second security memory slot for storing the administrator password.

37. A computer system for administrator access to a user power-on password using a single password, comprising:
  a processor for executing code; and
  a non-volatile memory storing a user power-on password, an administrator password, and password verification code, the password verification code executable by the processor and when executed, performing the steps of:
    generating a password prompt for a user input string;
    detecting a user input string entered at the password prompt;
    comparing said user input string to an administrator password; and
    allowing access to a user power-on password if said user input string matches said administrator password.

38. The computer system of claim 37, wherein said allowing access step comprises the step of allowing said user power-on password to be changed.

39. The computer system of claim 37, the processor further performing the steps of:
  comparing said user input string to said user power-on password; and
  allowing access to said user power-on password if said user input string matches said user power-on password.

* * * * *

UNITED STATES PATENT AND TRADEMARK OFFICE
CERTIFICATE OF CORRECTION

PATENT NO. : 6,397,337 B1 Page 1 of 1
DATED : May 28, 2002
INVENTOR(S) : Michael R. Garrett et al.

It is certified that error appears in the above-identified patent and that said Letters Patent is hereby corrected as shown below:

Column 5,
Lines 27, 30, 35 and 38, delete "0" and insert -- '0' --.
Lines 29, 34 and 37, delete "1" and insert -- '1' --.

Column 11,
Line 55, delete "adminsi-" and insert -- adminis- --.

Signed and Sealed this

Twenty-first Day of February, 2006

JON W. DUDAS
*Director of the United States Patent and Trademark Office*